United States Patent [19]
Dixon

[11] Patent Number: 5,218,610
[45] Date of Patent: Jun. 8, 1993

[54] TUNABLE SOLID STATE LASER
[75] Inventor: George J. Dixon, Melbourne, Fla.
[73] Assignee: Amoco Corporation, Chicago, Ill.
[21] Appl. No.: 880,498
[22] Filed: May 8, 1992
[51] Int. Cl.$^5$ .............................. H01S 3/10
[52] U.S. Cl. ........................ 372/20; 372/97; 372/99
[58] Field of Search ............ 372/20, 97, 99, 106
[56] References Cited

U.S. PATENT DOCUMENTS

| | | | |
|---|---|---|---|
| 3,609,586 | 9/1971 | Ha | 372/20 |
| 3,789,318 | 1/1974 | Ostrowsky et al. | 372/20 |
| 3,902,137 | 8/1975 | Hughes | 372/20 |
| 4,181,899 | 1/1980 | Liu | 372/20 |
| 4,639,923 | 1/1987 | Tang et al. | 372/20 |
| 4,660,204 | 4/1987 | Dewhirst et al. | 372/20 |
| 4,945,539 | 7/1990 | Bagshaw et al. | 372/20 |
| 5,001,716 | 3/1991 | Johnson et al. | 372/20 |

Primary Examiner—John D. Lee
Assistant Examiner—Robert E. Wise
Attorney, Agent, or Firm—James A. Gabala; Frank J. Sroka; Thomas W. Tolpin

[57] ABSTRACT

An electronically tuned, optically pumped, transition metal based, solid-state laser is disclosed. Tuning is achieved by using resonant reflecting means comprising an output mirror, a mirror located between the output mirror and the source of laser light, a polarizer located in the light path between the two mirrors, and an electronically tuned, voltage controlled, variable, liquid crystal waveplate for receiving light passing through the polarizer. The components of the resonant reflecting means are selected to have a longitudinal mode that is anti-resonant with the optical cavity of the laser.

21 Claims, 1 Drawing Sheet

TUNABLE SOLID STATE LASER

Technical Field

This invention relates to the general subject of solid state lasers and, in particular, to lasers which can be operated over a range of wavelengths.

BACKGROUND OF THE INVENTION

Interest in the development of tunable solid-state lasers has increased significantly in recent years. The potential for storing energy in the population inversion and the long, maintenance-free operating lifetimes of solid-state lasers make the current generation of laser- and lamp-pumped, transition-metal-doped, insulating crystal lasers superior to dye lasers for many scientific and technical applications including laser spectroscopy and remote sensing. Unfortunately, widespread commercial use of these lasers will require significant reductions in complexity, size, and cost.

These lasers are characterized by a broad gain spectrum (which, in some cases, is several hundred nanometers wide) and typically have an intra-cavity tuning element which can be used to tune the output wavelength over a portion of this curve. Earlier devices (e.g., ones using $Co:MgF_2$ or $Ti:Al_2O_3$) used a mechanical Lyot Filter which was inserted inside a laser cavity and rotated to shift the output wavelength of the laser. See Lovold et al., IEEE J.Q.E., QE-21(3) page 202 (March, 1985). Galvanometer controlled etalons or Lyot Filters incorporating electro-optic crystals have also been used for this purpose. See Otsuka et al., *Optics Communications*, 63(1), p. 37 (July 1987). One disadvantage of using a diffraction grating is that it cannot be tuned electronically.

Tuning elements, like the mechanically-tuned Lyot Filter and galvano-driven etalon, in which an optical component is physically translated are comparatively slow and bulky. The electro-optic Lyot Filter is faster and smaller but requires a voltage of several hundred volts to tune it. For these reasons, the tuning techniques described in the prior art are not well suited to compact, diode-pumped tunable laser systems, such as Cr:LiSAF.

A liquid crystal Lyot Filter is described by Shin-Tson Wu, *Applied Optics*, 28,48, (1989): J. R. Andrews, IEEE *Photonics Technology Letters*, 2, 334 (1990) and in U.S. Pat. No. 4,394,069 to W. I. Kaye entitled "Liquid Crystal Tuned Birefringent Filter." As with any conventional birefringent tuner, light that is transmitted through the polarizer passes through the variable waveplate, is reflected by the mirror and again transmitted through the waveplate and polarizer. The return beam is attenuated if the retardation of the variable birefringent plate is not an integral number of half-waves. The liquid crystal waveplate will only act like a half- or full-waveplate for a band of wavelengths. Wavelengths lying outside this band are attenuated by the polarizer as they return through it.

Unfortunately, the maximum single-pass transmission of the polarizer/waveplate combination is between 90% and 98%, making it useless as an intra-cavity tuning element in a low-gain, diode-pumped system. It is useful, however, in high-gain systems and compound liquid crystal birefringent filters have been used as an intra-cavity tuning element in external cavity laser diodes (see "Electronically tunable single-mode external-cavity diode laser", J. R. Andrews, *Optics Letters*, 16, 732–734 (1991)). The development of AlGaInP semiconductor lasers with output wavelengths near 670 nm has led to the demonstration of CW, diode-pumped lasers in Alexandrite or ($Cr^{3+}$: $BeAl_2O_4$) (See R. Scheps, et al., Appl. Phys. Lett. 56, 2288 (1990)), in $Cr^{+3}:LiSrAlF_6$ or (Cr:LiSAF) (See G. J. Dixon, et al., *Digest of Sixth Interdisciplinary Laser Science Conference*, (American Physical Society, New York, 1990), paper B3-1; Q. Zhang et al., *Digest of Conference on Lasers and Electro-Optics* (Optical Society of America, Washington, D.C., 1991), paper CTHR6; and R. Scheps, et al., Opt. Lett. 16, 820 (1991)) and in $Cr^{3+}:LiCaAlF_6$ or (Cr:LiCAF) (See R. Scheps, IEEE J. Quantum Electron., 27, 1968 (1991)). Because of a broad, intense absorption near 670 nm and an advantageous combination of emission cross section and lifetime, diode-pumped operation of 10%-doped Cr:LiSAF lasers with threshold powers as low as 3 mW have been demonstrated. With dye-laser excitation, a slope efficiency of 41% was measured for broadband operation near 850 nm. High-power, quasi-CW diode-pumped operation from a laser incorporating lower-doped Cr:LiSAF has also been reported (See R. Scheps, et al., *Digest of the Advanced Solid State Laser Conference* (Optical Society of America, Washington, D.C., 1991), p. 291).

Although the cross-section lifetime product (i.e., product of stimulated emission cross section and lifetime) of Cr:LiSAF is higher than that of other tunable chromium-doped materials, it is approximately 50 times smaller than that of Nd:YAG (and many other rare-earth doped hosts). As a result, increasing the intra-cavity losses of a diode-pumped laser through the addition of intra-cavity tuning elements significantly increases its threshold.

It would be most advantageous if a relatively simple, low cost, compact apparatus and method were available which would allow the use of materials like Cr:LiSAF. It would be especially advantageous if such a laser could be efficiently tuned over a range of frequencies.

SUMMARY OF THE INVENTION

A general object of the invention is to provide a tuning technique which has minimized intra-cavity losses in a low gain system.

Yet another object of the invention is to provide a coupled-cavity tuning element which can be operated at low voltage.

Still another object of the invention is to provide a liquid crystal Lyot Filter which can be used to tune a low-gain diode-pumped solid-state laser.

One specific object of the invention is to disclose a coupled-cavity liquid crystal tuner for a thulium fiber laser.

Another object of the invention is to provide a tuning technique which is relatively fast, consumes little power, has no moving parts, and is relatively small in size.

In accordance with the present invention, a tunable laser is provided comprising: an optically pumpable lasant material; an input mirror; and resonant reflecting means for forming with said input mirror an optical cavity for said lasant material. The resonant reflecting means comprises: an output coupler component; a mirror component, located between said output coupler component and said lasant material, for transmitting light from said lasant material to said output coupler component; a polarizer component located in the light path between said mirror and said output coupler; and an electronically tuned, voltage controlled, variable, liquid crystal waveplate component for receiving light passing through said polarizer, said components of said resonant reflecting means being selected to have a longitudinal mode that is anti-resonant with said optical cavity.

The invention provides a tuning technique which is relatively fast (e.g., it can be swept through a full tuning range at KHz rates) and consumes very little power. By means of a liquid crystal variable retarder, a low-gain laser can be quickly tuned through a retardation of several thousand nanometers with an applied potential of a few volts. This tuning method is well-suited for use in a compact, diode-pumped laser because it has no moving parts, is very compact and consumes very little power.

Numerous other advantages and features of the present invention will become readily apparent from the following detailed description of the invention, the embodiments described therein, from the claims, and from the accompanying drawings.

DETAILED DESCRIPTION

Figure 1:
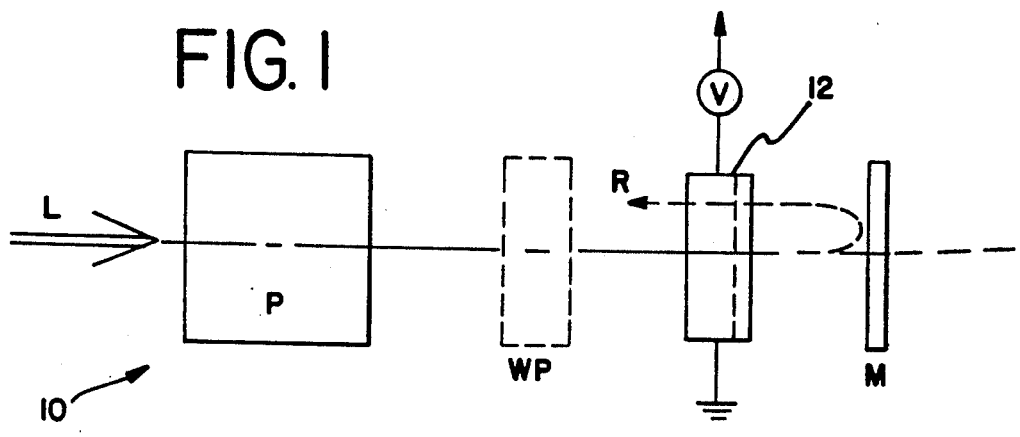
FIG. 1 is a schematic diagram of a liquid crystal Lyot Filter that is the subject of the present invention.

While this invention is susceptible of embodiment in many different forms, there is shown in the drawings, and will herein be described in detail, two specific embodiments of the invention. It should be understood, however, that the present disclosure is to be considered an exemplification of the principles of the invention and is not intended to limit the invention to the specific embodiments illustrated.

Turning to the drawings, FIG. 1 is a schematic representation of a liquid crystal Lyot Filter 10 of the type used in the present invention. The general operation of this type of filter is described by S. T. Wu, *Applied Optics*, 28,48,(1989); J. R. Andrews, *IEEE Photonics Technology Letters*, 2, 334 (1990); and by W. I. Kaye in U.S. Pat. No. 4,394,069 "Liquid Crystal Tuned Birefringent Filter." The Lyot Filter comprises a polarizer P, a liquid crystal/variable waveplate 12, and a mirror M. When used to tune a standing-wave laser, the birefringent filter of FIG. 1 replaces one of the end-mirrors of the laser resonator. The principle axes of the liquid crystal waveplate 12 are tilted at 45 degrees relative to the polarization direction which is transmitted by the polarizer P. Light L that is transmitted through the polarizer P passes through the variable waveplate 12, is reflected by the mirror M and again transmitted though the waveplate and polarizer. The return beam R is attenuated if the retardation of the variable birefringent waveplate 12 is not an integral number of half-waves. The liquid crystal waveplate 12 will only act like a half- or full-waveplate for a band of wavelengths. Wavelengths lying outside this band are attenuated by the polarizer P as they return through it.

If the filter 10 of FIG. 1 is used in place of one of the end-mirrors of a standing-wave, linear cavity laser, the gain medium sees a reflectivity that is wavelength dependent. The reflectivity is maximum at those wavelengths where the retardation is an integral number of half waves and approaches zero at those where it is an odd integral multiple of a quarter wave. The wavelengths that are attenuated the least by the polarizer/waveplate/mirror combination can be changed by varying the voltage V applied to the waveplate 12. Thus, the assembly 10 shown in FIG. 1 is a voltage-controlled tuning element.

While it is only necessary to vary the retardation of the variable waveplate 12 by one half of the center wavelength of the tuning range to tune it over its maximum range, a large value of total retardation is often required to narrow the bandwidth of the filter. This can be achieved by inserting a fixed birefringent plate WP, with axes parallel to those of the variable waveplate 12, between the polarizer P and the mirror M. Such an element WP is shown with a dotted outline in FIG. 1. Unfortunately, the maximum single-pass transmission of the polarizer/waveplate combination is between 90% and 98%, making it impractical as an intra-cavity tuning element in a low-gain, diode-pumped system.

Figure 2:
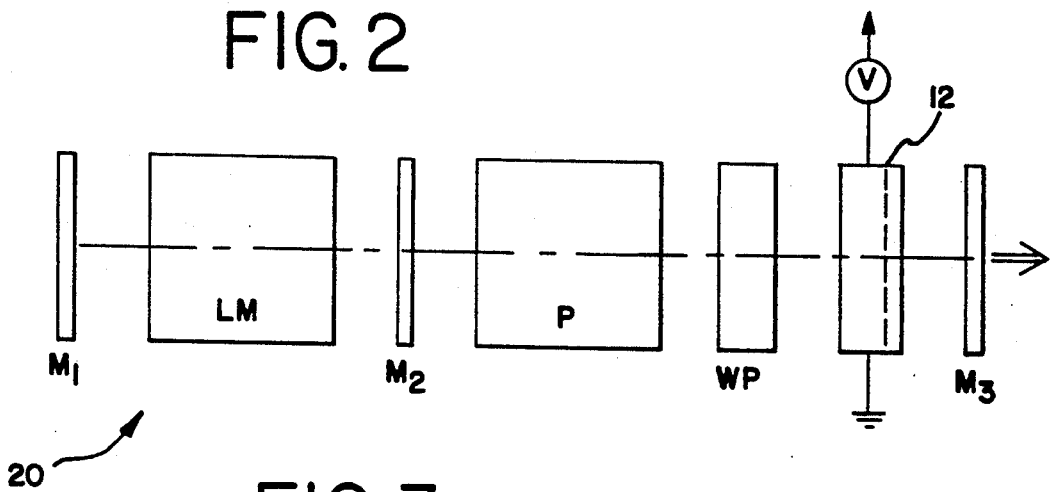
FIG. 2 illustrates one embodiment of a laser system that incorporates the liquid crystal Lyot Filter of FIG. 1.

The liquid crystal birefringent filter 10 of FIG. 1 can be used with low-gain laser systems if it is placed inside a resonant reflector as shown in FIG. 2. By placing the lossy elements inside a coupled-cavity, it is possible to tune the laser without increasing the losses seen by the gain medium to an unacceptably high level.

Turning to FIG. 2, there is illustrated a primary laser cavity formed by two end mirrors M1 and M2 in which a lasant material LM is located, and a Lyot Filter 10 which forms a coupled-cavity. Although coupled-cavity tuning techniques in which a diffraction grating is used in place of M3 are described in the literature they are not known to have used in connection with an electronically-tuned element and a liquid crystal waveplate in laser systems described by this invention. If we consider the equivalent reflectivity of the cavity formed by mirrors M2 and M3 of FIG. 2 (without the variable waveplate and polarizer), those skilled in the art know that the reflectivity varies with wavelength (See Siegman, A. E., *Lasers*, University Science Books, 1986, pages 413–426). On resonance (i.e., when the frequency of the input is a multiple of $$c\left[2\sum_{i=1}^{\Sigma} n_i L_i\right]^{-1}$$

where "c" is the velocity of light, "$n_i$" is index of refraction of the "i" th optical element, "$L_i$" is its length, and $$\sum_{i=1} L_i$$

is the total length of the cavity), the reflectivity is a minimum. Between these points are broad regions where the reflectivity is maximum. More importantly, it follows that the "effective reflectivity" of a two-mirror resonant reflector (i.e., considering actual reflectivity plus the round-trip losses inside the resonator) can be significantly larger than the reflectivity of either of the mirrors from which it is made. As an example, we can consider the effect of intra-cavity losses on a cavity with an input reflectivity of 98% and output reflectivity of 96%. As loss is added into the cavity, the effective reflectivity of the output mirror decreases from 96%. If we assume that the round-trip losses of the coupled-cavity are equal to 20% (e.g., a good approximation to the losses of a liquid crystal waveplate/polarizer combination), then its anti-resonant reflectivity (calculated using Siegman's analysis on page 424) for a beam incident from the 98% mirror is significantly greater than 99%. In fact, calculations show that the effective reflectivity of the resonant reflector is greater than 99% for any effective reflectivity of M3 greater than 20%. Thus, a resonant reflector makes it possible to tolerate very high intra-cavity losses without a significant reduction in anti-resonant reflectivity.

If we now insert a variable waveplate or tuning element 12 and polarizer P in the cavity (between mirrors M2 and M3), these elements and the mirror M3 form a birefringent tuner of the type shown in FIG. 1. The reflectivity of the coupled cavity is then modulated by, or is a function of, wavelength (i.e., the effective reflectivity of the output mirror M3 is given by the actual reflectivity of the mirror minus the round-trip losses of the polarizer/waveplate combination). For wavelengths transmitted by the birefringent tuner, the effective reflectivity is equal to the actual reflectivity minus the possessive losses of the birefringent filter. In a typical crystal liquid waveplate birefringent tuner this reflectivity is in the range of 20% to 40%. For the wavelengths attinuated by the filter the effective reflectivity is equal to zero (if the polarizer is good).

The maximum reflectivity of the coupled cavity formed by the two mirrors M2 and M3 is therefore a function of wavelength. For wavelengths transmitted by the birefringent filter, it can be quite high, as described above. However, for wavelengths which are not transmitted by the filter, the effective reflectivity is given by the reflectivity of one mirror M2 alone. This variation in anti-resonant reflectivity of the two mirror combination can be used to tune the laser output.

These properties of the coupled-cavity birefringent tuner make it well-suited for tuning low-gain, diode-laser-pumped solid-state lasers, like Cr:LiSAF. Cr:LiSAF has an advantageous combination of spectroscopic and material properties. (See Qi Zhang and G. J. Dixon, et al., "Electronically Tuned Diode-Laser-Pumped Cr:LiSrAlF$_6$ Laser", *Optics Letters*, 17(1), 43–45 (Jan. 1, 1992)). In addition to a cross-section lifetime product that is greater than that of the other Cr-doped tunable materials, Cr:LiSAF can be doped at concentrations exceeding 10% without appreciable lifetime quenching or degradation of crystal quality. In 10%-doped material, the 670-nm absorption coefficient is approximately 50 cm$^{-1}$; this makes it possible to use submillimeter-thick platelets of grain material without sacrificing pump absorption. Short absorption depth makes it possible for the material to absorb a tightly focused pump beam before it can expand appreciably. Since the threshold power is proportional to the sum of the areas of the pump and laser modes, averaged across the active length of the gain medium, it is possible to minimize the laser threshold by tightly focusing the pump into a small mode volume in a highly doped Cr:LiSAF crystal. In this application, the input mirror M2 of the coupled-cavity has a transmission of a few percent, just large enough to keep the laser from operating off of that mirror alone. This mirror is coupled to a liquid crystal birefringent filter 10 of the type shown in FIG. 1. The coupled resonator is designed to mode-match the fundamental transverse mode of the primary resonator which contains the laser gain medium. Its output transmission is between 2% and 25% and is chosen to optimize the output coupling of the laser. Varying the birefringence of the liquid crystal waveplate 12 will then tune the output of the laser over a broad spectral range. In our initial experiments, we have been able to tune the output over a range of 60 nm with an applied potential difference of less than 2 volts.

While placing the birefringent tuner in a coupled-cavity minimizes its losses, it also makes it necessary to control the relative cavity lengths of the coupled-cavity and the primary resonator. The coupled-cavity tuning arrangement will not operate properly if the frequency of the input is not anti-resonant with the cavity. To first approximation, the resonant frequency of the primary cavity formed by mirrors, M1 and M2 in FIG. 2 determines the input frequency to the coupled-cavity. In order to assure anti-resonant operation, its optical path length must be adjusted so that the frequencies of its longitudinal modes are anti-resonant with the coulped-cavity. In practice, this means that the cavity length of both cavities must be stabilized to a small fraction of a wavelength. The output power of these lasers can be used as a control signal for the coupled-cavity length control.

Figure 3:
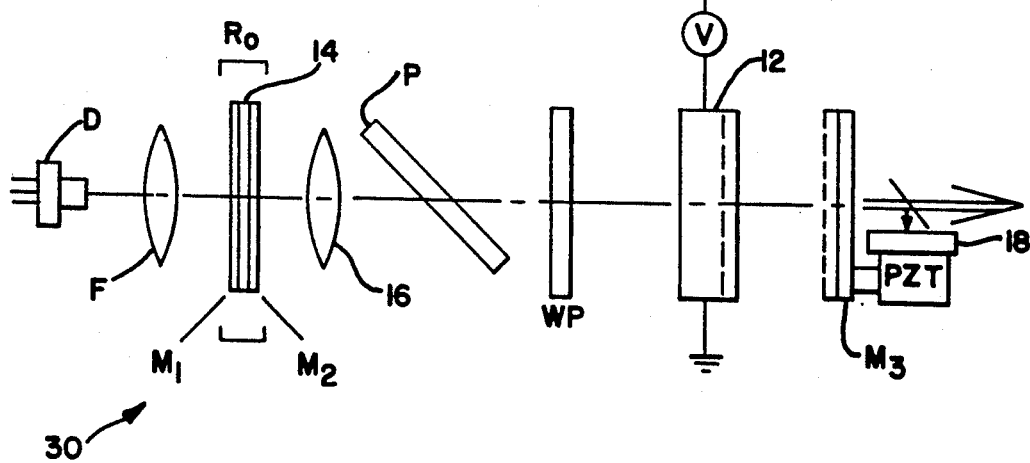
FIG. 3 is a schematic diagram of another laser system that incorporates the liquid crystal Lyot Filter of FIG. 1.

FIG. 3 shows a preferred embodiment of a tunable, coupled-cavity Cr:LiSAF laser 30 in which a liquid-crystal wave plate 12 and a dielectric polarizer P are used as an electronically controlled tuning element. A thin (i.e., preferably 0.5-mm-thick or less) crystal 14 of 10% Chromium-doped (preferably exceeding 5%) Cr:LiSAF (e.g., grown from a chromium-doped melt at the CREOL Crystal Growth Laboratory at the University of Central Florida) was polished flat and parallel and coated with dielectric reflectors M1 and M2 to form a cube laser resonator R. The pump face M1 was highly reflective (HR) at 865 nm (preferably between 820 nm and 880 nm) and highly transmitting (HT) at a pump wavelength of 670 nm. The opposite face M2 was coated for 90% to 98% reflectivity at 865 nm (preferably between 820 nm and 880 nm). The Cr:LiSAF crystal 14 was pumped with the output of an InGaAlP laser diode D which is focused by a lens F using conventional techniques (cf., U.S. Pat. No. 5,105,434) to Krupke and Payne).

Suitable optical pumping means include, but are not limited to, laser diodes, light-emitting diodes (including superluminescent diodes and superluminescent diode arrays) and laser diode arrays, together with any ancillary packaging or structures. For the purposes hereof, the term "optical pumping means" includes any heat sink, thermoelectric cooler or packaging associated with said laser diodes, light-emitting diodes and laser diode arrays. For example, such devices are commonly attached to a heat resistant and conductive heat sink and are packaged in a metal housing. For efficient operation, the pumping means D is desirably matched with a suitable absorption band of the lasant material. The heat sink can be passive in character. However, the heat sink can also comprise a thermoelectric cooler or other temperature regulation means to help maintain laser diode at a constant temperature and thereby ensure optimal operation of laser diode at a constant wavelength. It will be appreciated, of course, that during operation the optical pumping means D will be attached to a suitable power supply. Electrical leads from laser diode D, which are directed to a suitable power supply, are not illustrated in the drawings for simplicity.

Conventional light-emitting diodes and laser diodes are available which, as a function of composition, produce output radiation having a wavelength over the range from about 630 nm to about 1600 nm, and any such device producing optical pumping radiation of a wavelength effective to pump a lasant material can be used in the practice of this invention. For example, the wavelength of the output radiation from InGaAsP based devices can be used to provide radiation in the wavelength range from about 1000 to about 1600 nm.

If desired, the output facet of semiconductor light source D can be placed in butt-coupled or close coupled relationship to input surface of the lasant material without the use of optics F, thereby reducing the size and complexity of the device. (See U.S. Pat. No. 4,847,851 to Dixon for a description of close-coupled pumping of high-concentration laser materials). As used herein, "butt-coupled" is defined to mean a coupling which is sufficiently close such that a divergent beam of optical pumping radiation emanating from semiconductor light source D or laser diode will optically pump a mode volume within the lasant material 14 with a sufficiently small transverse cross-sectional area so as to support essentially only single transverse mode laser operation (i.e., $TEM_{00}$ mode operation) in the lasant material.

Returning to FIG. 3, a lens F, located to the left of the laser diode source D, is used to focus pumping radiation into lasant material 14. This focusing results in a high pumping intensity and an associated high photon to photon conversion efficiency in lasant material. Focusing means F can comprise any conventional means for focusing light such as a gradient index lens, a ball lens, an aspheric lens or a combination of lenses. The output from the primary resonator R is sent by means of another lens 16 to the wavelength-tuning element.

The wavelength-tuning element, comprising of a dielectric polarizer P and a variable wave plate 12, is located between the lens 16 and the output mirror M3. The axes of the fixed waveplate WP and variable birefringent waveplate 12 are preferably oriented at 45 degrees with respect to the direction of maximum transmission through the polarizer P. The output mirror M3 is a flat having a reflectivity between 90% and 98% over the range from 820 nm to 880 nm on the intracavity surface and having an AR coating good for the same wavelength range, on the output. The output mirror M3 is mounted on a piezoelectric translator PZT for active cavity length control and the gain element is preferably housed in a temperature controlled enclosure. In this configuration, the reflectivity of the resonant cavity formed by the output face M2 of the Cr:LiSAF cube 14 and the output mirror M3 determines the threshold of the laser.

Using the well-known expression for the reflectivity of an anti-resonant optical cavity, it can be shown that the effective reflectivity of the tuning cavity is greater than 99% for all cases in which the round-trip losses (i.e., output coupling plus absorption and scatter) are less than 88%. Thus, relatively lossy tuning elements can be placed inside the coupled-cavity *without* increasing the threshold of the laser to an unacceptably high value. Because it is a monolithic design, the cavity R is stable against vibrations and its length stabilized with a simple temperature control.

Electronic tuning was accomplished by using a fixed wave plate WP and a liquid-crystal variable retarder 12 (obtained from Meadowlark Optics of Longmont, Colorado). The liquid-crystal retarder 12 was chosen as the electronically controlled tuning element since its operating voltage is approximately two orders of magnitude smaller than that of variable retarders based on electro-optic insulating crystals. The fixed waveplate WP had seven waves of retardation at 865 nm, while the retardation of the liquid-crystal retarder 12 could be varied from 2000 to 2900 nm by varying the 2-kHz AC control voltage V from 0 to 20 volts. Although the round-trip loss of the liquid-crystal tuning element was greater than 5%, an incident power threshold of 22 mW was observed when a mirror M3, coated for 96% reflectivity at 920 nm, was used as an output. At an input power of 42 mW the laser output consisted of several longitudinal modes, separated by the free spectral range of the cube resonator $R_o$, which spanned approximately 5 nm. By using a voltage-controlled liquid-crystal variable wave plate, the laser output was tunable over a range of 65 nm with an applied voltage V of only 3 volts. The output power tuning curve, corresponding to an applied potential difference of 3 volts, had an asymmetric shape which is believed to be due to a rapid decrease in the transmission of the dielectric polarizer below 860 nm. A maximum output power of 4.3 mW corresponded to an optical slope efficiency of 22%. Improvements in output efficiency and tuning range are expected with optimization of the coating reflectivities and a reduction of losses in the tuning elements. It is reasonable to expect optical efficiencies approaching 40% and a tuning range of 80 to 100 nm from a properly designed laser. Single-frequency operation over a continuous range of output wavelengths should be possible in a laser that incorporates multiple liquid-crystal filters and a temperature-controlled gain element.

Without cavity length control, significant amplitude instability was observed in the output of the coupled-cavity laser owing to fluctuations in the optical path length between the cube resonator R and the output mirror M3. It is clear that the lengths of both the cube resonator R and the cavity containing the tuning elements P, WP and 12 must be controlled in a practical device. This can be accomplished by designing a stable temperature-controlled resonator and/or mounting the output coupler M3 on a piezoelectric translator PZT and using a control 18 to adjust its position to maintain constant output power.

The coupled-cavity, liquid crystal waveplate tuner can be used to tune any laser which requires a low-loss optical resonator for its operation. Clearly, low gain, diode-pumped tunable solids state lasers like Cr:LiSAF, Cr:LiCAF, Cr:LiSCAF, etc. fall into this category. It may also be used to tune a titanium sapphire laser. Another use is to tune a Thulium (Tm) fiber laser (e.g., a 2$\mu$ Tm fiber laser). Thulium in a silica fiber has a very broad gain spectrum which spans a wavelength range from 1.8 to beyond 2.0 microns. In contrast to many fiber lasers, the Tm laser operates best in a high finesse resonator which will minimize the excited state population needed for laser operation. This is due to up-conversion from the upper laser level which significantly decreases the efficiency of the laser at population densities. The coupled-cavity liquid crystal tuner just described is well-suited to this device, since it can tune the fiber laser over a broad spectral range without significantly increasing the intra-cavity losses.

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. Various changes may be made, materials substituted and features of the invention may be utilized. Pumping at 760 nm using a GaAlAs device is suggested. For example, the precise geometric shape of lasant material can vary widely. Similarly the lasant material can be doped with a variety of rare earth. The lasant material can be rod-shaped or rhombohedral in shape if desired, and lens-shaped ends can be used if desired. An end-pumped fiber of lasant material can also be used. In particular, optical fibers, which are doped with Thulium, for example, are suggested. The length of such a fiber is easily adjusted to result in absorption of essentially all of the optical pumping radiation. If a very long fiber is required, it can be coiled, on a spool for example, in order to minimize the overall length of the laser apparatus. Thus, it will be appreciated that various modifications, alternatives, variations, etc., may be made without departing from the spirit and scope of the invention as defined in the appended claims. It is, of course, intended to cover by the appended claims all such modifications involved within the scope of the claims.

I claim:

1. A tunable laser, comprising:
   an optically pumpable lasant material; an input mirror; and resonant reflecting means for forming with said input mirror an optical cavity for said lasant material, said resonant reflecting means comprising:
   a) an output coupler component;
   b) a mirror component located between said output coupler component and said lasant material, for transmitting light from said lasant material to said output coupler component;
   c) a polarizer component located in the light path between said mirror and said output coupler; and
   d) an electronically tuned, voltage controlled, variable, liquid crystal waveplate component for receiving light passing through said polarizer, said components of said resonant reflecting means being selected to have a longitudinal mode that is anti-resonant with said optical cavity.

2. The tunable laser of claim 1, further including:
   e) a fixed waveplate component located between said polarizer component and said liquid crystal component.

3. The laser of claim 1, further including:
   h) means for moving said output coupler component towards and away from said mirror component to stabilize the length of said anti-resonant cavity.

4. The laser of claim 1, further including:
   h) temperature control means for stabilizing the length of said optical cavity.

5. The laser of claim 1, wherein said lasant material is selected from the group Cr:LiSAF, Cr:LiCAF, Cr:LiSCAF, and Ti:Sapphire.

6. The laser of claim 1, wherein said lasant material is doped with a material selected from the group cobalt, nickle, vanadium, chromium, thulium, erbium, holmium, titanium neodymium and praseodymium.

7. The laser of claim 1, wherein said lasant material is in the form of an optical fiber.

8. The laser of claim 1, wherein said lasant material carries a dopant and is characterized by a broad intense absorption peak and low concentration quenching at relatively high concentrations of said dopant.

9. A coupled-cavity liquid crystal tuner for a solid-state laser having a resonant cavity formed between two opposite end mirrors and having a lasant material located therein, comprising:
   a) a polarizer for receiving light from one of said end mirrors;
   b) a voltage controlled liquid crystal waveplate for receiving light passing through said polarizer;
   c) a third mirror for receiving light passing through said liquid crystal waveplate and reflecting said light back to said one end mirror, said third mirror being coated to be reflective over a range of wavelengths that include the light from said laser; and
   d) means for stabilizing the length of the optical cavity formed between said third mirror and said one end mirror and maintaining said optical cavity anti-resonant relative to resonant cavity.

10. The tuner of claim 9, further including a fixed waveplate for receiving light passing through said polarizer and towards said third mirror.

11. The tuner of claim 9, wherein said laser comprises a low gain lasant material.

12. A laser, comprising:
   a) optical pumping means;
   b) a plane-parallel cube of lasant material having an input face and an opposite output face, said input face being coated for high reflectivity over at least a portion of the wavelengths that said lasant material lases in response to said optical pumping source and for high transmission over at least a portion of the wavelengths of operation of said optical pumping source, said output face having some transmission over at least part of said wavelengths that said lasant material lases;
   c) a polarizer;
   d) optical means for directing light from said output face to said polarizer;
   e) a fixed birefringent waveplate for receiving light passing through said polarizer;
   f) an electronically tuned, voltage controlled, variable, liquid crystal waveplate for receiving light passing through said fixed waveplate, the axes of said waveplates being generally aligned and at an angle to the direction of maximum transmission through said polarizer; and
   g) an output mirror for receiving light passing through said liquid crystal waveplate and for forming with said output face of said lasant material an optical anti-resonant cavity, said output mirror being reflective over a range of wavelengths including said portion that said lasant material lases.

13. An anti-resonant tuning element for a primary resonator of a solid-state, diode-pumped laser comprising:
   a) a polarizer for receiving light from said primary resonator;
   b) an electronically tuned, voltage controlled, variable, liquid crystal waveplate for receiving light passing through said polarizer; and
   c) an output mirror for receiving light passing through said liquid crystal waveplate, said mirror being reflective over a range of wavelengths including at least one of the wavelengths that said solid-state diode-pumped laser operates, said polarizer, said liquid crystal waveplate and said output mirror being selected to have a longitudinal mode that is anti-resonant relative to said primary resonator.

14. The tuning element of claim 13, further including:
d) a fixed waveplate for receiving light passing through said polarizer and towards said liquid crystal waveplate.

15. The tuning element of claim 14, further including:
e) means for moving said output mirror towards and away from said primary resonator to maintain anti-resonance.

16. The tuning element of claim 15, further including:
f) means for maintaining the temperature of said tuning element.

17. The tuning element of claim 13, wherein said laser comprises a thulium doped optical fiber.

18. A method for tuning the output of a solid-state laser having at least one cavity end mirror comprising the steps of:
a) coupling an anti-resonant cavity to the output of said laser by using said one cavity mirror;
b) locating within said anti-resonant cavity a Lyot Filter having a liquid crystal birefringent element located therein; and
c) adjusting the voltage across said liquid crystal element to change the effective reflectance of said one cavity end mirror.

19. The method of claim 18, further including the step of:
d) stabilizing the length of said anti-resonant cavity.

20. The method of claim 19, further including the step of:
e) stabilizing the temperature of said anti-resonant optical cavity.

21. A tunable diode-pumped laser, comprising:
a) a primary optical cavity, having a solid-state lasant material located therein, that produces laser light in response to pumping by a laser diode, said lasant material carrying a dopant and being characterized by a broad intense absorption peak and low concentration quenching at relatively high concentrations of said dopant; and
b) an anti-resonant, adjustably reflective optical cavity coupled to said primary optical cavity and having a liquid crystal Lyot Filter located therein.

* * * * *